United States Patent Office.

WILHELM WEBER, OF STOLBERG II, GERMANY, ASSIGNOR TO CHEMISCHE FABRIK RHENANIA, OF AACHEN, GERMANY.

PANCREAS PREPARATION AND PROCESS OF PRODUCING SAME.

SPECIFICATION forming part of Letters Patent No. 695,254, dated March 11, 1902.

Application filed August 28, 1900. Serial No. 28,336. (No specimens.)

*To all whom it may concern:*

Be it known that I, WILHELM WEBER, a citizen of Germany, residing at Stolberg II, Rheinland, in the Empire of Germany, have invented a certain new and useful Preparation from the Pancreas and Process of Producing It, (for which application for a patent has been made in Germany, dated April 21, 1900, and in Great Britain, dated August 11, 1900, No. 14,414,) of which the following is a specification.

The enzymes of the pancreatic gland, unlike pepsin, are very sensitive to the action of acids and the juices of the stomach, so that some authorities deem it to be useless to administer pancreatin preparations as medicaments. By this invention the enzymes of the pancreas are converted into an insoluble form in which they can resist acids and stomach-juices, while they remain freely soluble in alkaline liquids and can then exercise their digestive action.

For the purpose of this invention an extract of pancreas is mixed with a solution of tannin so long as a precipitate is produced. This precipitate contains all the active constituents of the pancreas. It is insoluble in water and in dilute acids and is unchanged by treatment with the juices of the stomach. It can, however, exercise the digestive function of the enzymes as soon as it is dissolved in a liquid which is alkaline. By the present invention therefore it is possible to make a preparation of pancreas which passes through the stomach unaltered and can exercise its function in the intestines.

The following examples illustrate the invention:

Example I: One hundred grams of pancreatin are stirred into a liter of water and the liquid is then filtered. To the filtrate is added a solution of twenty to twenty-five grams of tannin. The precipitate produced is collected on a filter, washed, and dried. Instead of pancreatin fresh pancreas-juice may be used.

Example II: The aqueous solution of one hundred grams of pancreatin prepared as described in Example I is made feebly alkaline with normal caustic-soda solution and is mixed with a solution of twenty to twenty-five grams of tannic acid. To the clear liquid is then added the equivalent proportion of an acid, and the precipitate thus produced is treated like that obtained in Example I.

Having thus described the nature of my said invention and the best means I know of carrying the same into practical effect, I claim—

1. A process for preparing a preparation of pancreas capable of resisting stomach-juices, by mixing a solution containing pancreatin with a solution of tannin containing an alkali then adding another acid and then collecting for use the precipitate thus produced.

2. An aseptic composition consisting of one hundred parts of pancreatin chemically combined with twenty parts of tannin and characterized by insolubility in gastric juice and solubility in intestinal juice.

In testimony whereof I have hereunto set my hand in presence of two subscribing witnesses.

WILHELM WEBER.

Witnesses:
   J. SCOTT,
   RUDOLF ARNETT.